Figure 1:
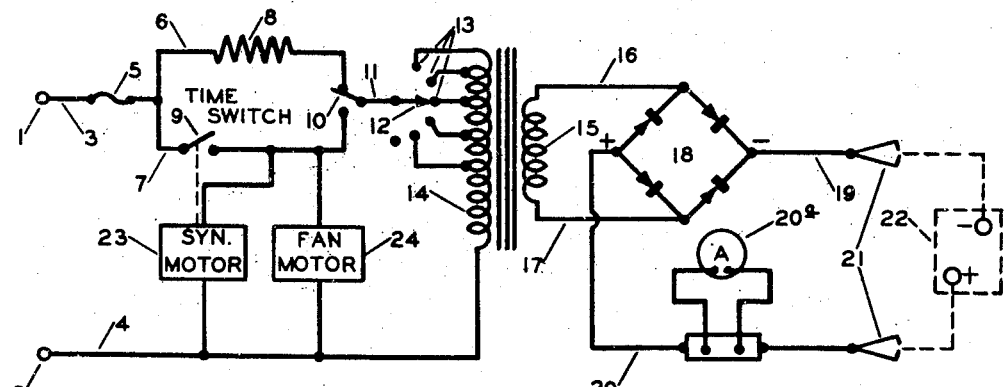

Dec. 21, 1948.     L. A. MEDLAR     2,456,978
BATTERY CHARGER
Filed Jan. 28, 1948

Inventor
LEWIS A. MEDLAR,
By Stone, Boyden & Mack,
ATTORNEYS

Patented Dec. 21, 1948

2,456,978

UNITED STATES PATENT OFFICE 2,456,978

BATTERY CHARGER

Lewis Abbott Medlar, Oreland, Pa., assignor to Fox Products Company, Philadelphia, Pa., a corporation of Pennsylvania Application January 28, 1948, Serial No. 4,778

9 Claims. (Cl. 320—14)

This invention relates to charging apparatus for storage batteries, and more particularly to a new and improved arrangement for fast charging, slow charging and testing such batteries.

A general object of the invention is to provide improved means for fast charging or discharging a battery for a predetermined length of time, or slow charging it for as long as desired.

Another object is to devise an improved input circuit arrangement having a switch which may be selectively set by hand to charge either at a fast rate or a slow rate as desired.

A further object is to so construct the apparatus that when set to charge at a fast rate an automatic timing switch must necessarily be included in the circuit, but when set to charge at a slow rate, such timing switch is undesirable and is excluded from the circuit.

As is customary in such equipment, the input circuit is designed to be connected to a source of alternating current, and a suitable rectifier, usually fed through a transformer, is employed to supply direct current for charging the battery. Yet another and specific object of the invention is to provide a motor driven fan for cooling the rectifier, and to so arrange the apparatus that the fan motor is energized only during the relatively short periods of fast charging and discharging. The rectifier does not need fan cooling during slow charging, and as this is usually continued for a relatively long period, disconnecting the fan motor during such period prevents unnecessary wear.

As is common in the art, the present improved apparatus may also employ a discharge resistor for testing the battery. A further specific object of the invention is to devise means whereby the same timing switch which controls the period of fast charging, will also control the period during which this discharge resistor is connected with the battery, and whereby during this period, the fan motor is energized and the input circuit to the transformer is broken.

Since, in connecting the discharge resistor to the battery for a discharge test, it is desirable to connect in the time switch, the time switch motor and the fan motor, as above mentioned, a still further object is to provide a circuit arrangement so designed that these connections are necessarily made when conducting a discharge test, regardless of the position of the manually operated fast-slow switch, and regardless of whether or not the time switch had been employed during the preceding charging operation.

Finally, another general object of the invention is to devise apparatus of the above character which shall be simple in construction, positive and trouble proof in action, and which can be satisfactorily operated by unskilled persons.

Figure 2:
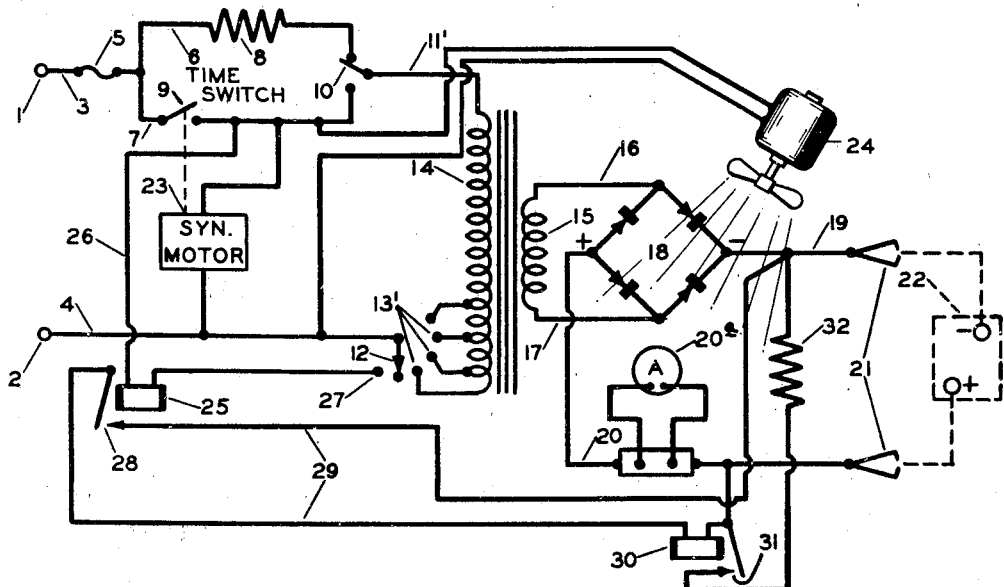

In order that the invention may be readily understood reference is had to the accompanying drawings forming part of this specification, and in which Fig. 1 is a diagram showing the improved input circuit arrangement, and Fig. 2 is a similar diagram but including in addition the improved arrangement for controlling the discharge resistor.

Referring to the drawings in detail and more particularly first to Fig. 1, 1 and 2 represent the terminals of power leads 3 and 4, adapted to be connected to a constant voltage source of alternating current, as for example, the usual 110 volt 60 cycle service outlets.

A suitable fuse or circuit breaker 5 is preferably inserted in the lead 3. This lead 3 is formed with two branches 6 and 7, the branch 6 including a suitable impedance or resistor 8, and the branch 7 including a time-controlled switch 9.

A manually operated double throw switch 10, which may be in the nature of a toggle switch is positioned between the free ends of the two branches 6 and 7 and is arranged to selectively engage either one, as desired.

This toggle switch is connected by a conductor 11 with a tap switch 12 adapted to engage any one of a series of taps 13 connected to different points of the primary winding 14 of the usual transformer.

The other power lead 4 is connected directly to the opposite end of this primary winding.

The transformer is provided with a secondary winding 15, connected by leads 16 and 17 with a rectifier 18. This may be of any suitable type but an air cooled dry disc rectifier is usually employed. From this rectifier extend conductors 19 and 20 connected at their ends with battery clamps 21 which are adapted to be attached to the terminals of the battery 22 to be charged. A suitable ammeter 20a is included in the conductor 20.

Although the time-controlled switch 9 may be operated by a mechanical or other types of motor, the preferred arrangement here is to drive it by means of an ordinary electric clock motor 23. This, it will be observed, is connected directly between the lead 4 and the branch 7 at a point between the switch 9 and the transformer.

When supplying energy to the rectifier at a high rate, the rectifier tends to become overheated, and it is desirable to provide a motor driven fan for cooling the same. Such a motor driven fan is indicated at 24, and it will be noted that this too is connected between the lead 4 and the branch 7, at a point between the switch 9 and the transformer, so that it is in parallel with the clock motor 23.

When it is desired to charge the battery at a fast rate the toggle switch 10 is thrown down into engagement with the terminal of the branch 7 and the time-controlled switch 9 is then closed. This establishes a direct connection between the terminal 1 and the tap switch 12, thus supplying a maximum amount of energy to the primary winding 14 of the transformer, and generating a correspondingly large current in the secondary. By means of the tap switch 12 the secondary voltage supplied to the battery may be varied as desired.

Upon the closing of the time-controlled switch 9 the clock motor 23 begins to run, and after it has run for a predetermined period for which the mechanism is set, it automatically opens the switch 9. This interrupts the supply of current to the primary winding of the transformer and terminates the fast charging of the battery.

If it is desired to charge the battery at a slow rate the toggle switch 10 is thrown up into the position shown in the drawings in which it engages the terminal of the branch 6, thus including the impedance or resistor 8 in the input circuit. Due to the presence of this resistor the amount of energy supplied to the transformer primary is substantially cut down, and charging of the battery then proceeds at a relatively slow rate. This slow charging may be continued as long as desired, since it is not governed in any way by the time-controlled switch. It may be employed in place of fast charging, or, if necessary, a period of slow charging may follow the fast charging.

It will be observed that the tap switch 12 is included in the input circuit when the toggle switch 10 is in the slow charging position as well as when it is in the fast charging position, so that the secondary or output voltage of the transformer may be varied as desired, for slow charging as well as for fast charging.

When the time-controlled switch 9 was closed as above described, to complete the fast charging circuit it also served to close the circuit of the fan motor 24. This motor therefore began to run when the switch 9 was closed and continued to run until this switch was automatically opened by the clock motor, and upon the opening of this switch the fan motor stopped. Thus, the fan motor operates only while the time-controlled switch 9 is closed, during the period of fast charging, and while the time-controlled switch remains open during the period of slow charging, as shown in the drawings, the fan remains idle.

From the foregoing, it will be seen that the present invention provides a manually operated switch 10 by means of which either one of two input circuits may be selectively employed, one for charging the battery at a fast rate, and the other for charging the battery at a slow rate, and that only the input circuit for charging at a fast rate contains the time-controlled switch. Thus this switch is effective only during the fast charging period and is idle during slow charging.

Referring now to Fig. 2 the same reference characters are employed to designate the same parts. In this figure, however, the arrangement of taps on the primary winding of the transformer has been reversed. That is to say the switch 10 is connected directly by a lead 11' with the upper end of the primary winding, while the taps 13' are arranged at the lower end thereof.

In addition to the features described in connection with Fig. 1 there is included in Fig. 2 a discharge relay 25, one end of the winding of which is connected by a conductor 26 with the branch 7 of the input circuit, at a point between the time-controlled switch 9 and the transformer, the same as the motors 23 and 24, while the other end of the relay winding is connected to a contact 27 adapted to be engaged by the same tap switch 12 which engages the taps 13'. It will be noted that in this case the tap switch 12 is connected directly with the power lead 4 and that it is necessary to swing it entirely off of all of the transformer taps before it can engage the contact 27. This insures that the relay 25 cannot be energized so long as any energy is being supplied to the transformer primary.

The relay 25 is provided with a pair of contacts 28 from which extend a pair of conductors 29, one of these being connected with the conductor 19 and the other being connected to one end of a secondary discharge relay 30. This relay in turn operates contacts 31 which when closed serve to connect a discharge resistor 32 across the conductors 19 and 20, that is to say in series with the battery.

From an inspection of Fig. 2 it will thus be seen that the relays 25 and 26 can only be energized when the time-controlled switch 9 is closed. Thus this time-controlled switch may be set to determine and limit the period during which the discharge resistor is connected across the battery. In other words the time-controlled switch 9 serves to govern both the period of charging at a fast rate and also the period during which the discharge resistor is in circuit.

In practice this discharge resistor will be mounted on the panel of the apparatus adjacent the rectifier so that it can be cooled by the same fan 24 that cools the rectifier, as shown in Fig. 2. Thus when testing the battery by means of the discharge resistor, and the time-controlled switch is closed as above described the motor driven fan 24 is also operated and serves to cool the discharge resistor.

What is claimed is:

1. A battery charger comprising a transformer having primary and secondary windings, a pair of power leads, a resistor, a time-controlled switch, means connecting said leads to said primary winding to constitute an input circuit and comprising manual means for selectively including either said resistor or time-controlled switch in said input circuit as desired, an electric powered motor for actuating said switch, said motor being connected with said power leads but energized only when said switch is closed, and means for supplying rectified current from the secondary of said transformer to the battery to be charged.

2. A battery charger comprising a transformer having primary and secondary windings, a pair of power leads, means for connecting said leads to said primary winding so as to provide either a relatively high resistance or a relatively low resistance input circuit, as desired, a time-controlled switch in said low resistance circuit only, an electric powered motor for actuating said switch and energized only when said switch is closed, and means for supplying rectified current from the secondary of said transformer to the battery to be charged.

3. A battery charger comprising a transformer having primary and secondary windings, a pair of power leads, a resistor, means connecting said leads to said primary winding to constitute an input circuit and comprising means for selectively including said resistor in or excluding it from said input circuit, a time controlled switch included in said input circuit when said resistor is excluded, an electric powered motor for actuating said switch, said motor being connected with said input circuit at a point between said switch and said primary winding, whereby said motor is operative only when said switch is closed, and means for supplying rectified current from the secondary of said transformer to the battery to be charged.

4. A battery charger comprising a pair of power leads, a rectifier and means for connecting it with the battery to be charged, a motor driven cooling fan for said rectifier, means including said power leads and a manual switch for providing either a fast charging or slow charging input circuit as desired, for supplying current to said rectifier, and a time controlled switch in said fast charging input circuit, said fan motor being connected across said fast charging input circuit and energized only when said switch is closed.

5. A battery charger comprising a transformer having primary and secondary windings, a pair of input power leads, one of said leads having two branches, a resistor in one of said branches, a time-controlled switch in the other of said branches, manual means for selectively connecting one end of said primary winding with either of said branches, as desired, the other lead being connected with the other end of said primary winding, a motor driven cooling fan having one side connected with said last mentioned lead and the other side connected with said branch containing said time-controlled switch at a point between said switch and the primary winding of said transformer, whereby said fan motor is energized only when said time-controlled switch is closed, and means for supplying rectified current from the secondary winding of said transformer to a battery to be charged.

6. A battery charger comprising a transformer having primary and secondary windings, a rectifier, means for connecting said secondary winding through said rectifier to the battery to be charged, a resistor, a pair of power leads, means for connecting said power leads to said primary winding to selectively provide either a fast charging input circuit, excluding said resistor, or a slow charging input circuit, including said resistor, a time-controlled switch in said fast charging circuit only, and a motor driven fan for cooling said rectifier, said fan motor being connected with said fast charging circuit and operative only so long as said time-controlled switch is closed.

7. A battery charger comprising a transformer having primary and secondary windings, a rectifier, means for connecting said secondary winding through said rectifier to the battery to be charged, a resistor, a pair of power leads, means for connecting said power leads to said primary winding to selectively provide either a fast charging input circuit, excluding said resistor, or a slow charging input circuit, including said resistor, a time-controlled switch in said fast charging circuit only, an electric powered device for actuating said switch and a motor-driven fan for cooling said rectifier, said switch-actuating device and said fan motor being connected with said fast charging circuit and operative only so long as said time controlled switch is closed.

8. A battery charger comprising a transformer having primary and secondary windings, a pair of input power leads, one of said leads having two branches, a resistor in one of said branches, a time-controlled switch in the other of said branches, manual means for selectively connecting one end of said primary winding with either of said branches, as desired, the other lead being connected with the other end of said primary winding, and means for supplying rectified current from the secondary winding of said transformer to a battery to be charged.

9. A battery charger comprising a transformer having primary and secondary windings, a rectifier connected with said secondary winding, conductors for connecting said rectifier to the battery to be charged, a discharge resistor, a pair of input power leads, one of said leads having two branches, an input resistor in one of said branches, a time-controlled switch in the other of said branches, a manually operated switch for selectively connecting one end of said primary winding with either of said branches, as desired, a discharge relay arranged to be energized from said input circuit and having one side connected with the branch containing said time-controlled switch at a point between said switch and said manually operated switch, which relay, when energized, serves to connect said discharge resistor across said conductors, and a second manually operated switch for selectively connecting the other input power lead to either the other side of said relay or the other end of said primary winding, as desired, whereby said relay can be energized only when said time switch is closed and only when the power input is disconnected from the transformer, regardless of the position of said first mentioned manually operated switch.

LEWIS ABBOTT MEDLAR.

REFERENCES CITED

The following references are of record in the file of this patent:

UNITED STATES PATENTS

| Number | Name | Date |
|---|---|---|
| 1,121,892 | Beach | Dec. 22, 1914 |
| 1,126,670 | Wilson | Jan. 28, 1915 |
| 1,135,285 | Hoyt | Apr. 13, 1915 |
| 1,382,622 | Bryce | June 28, 1921 |
| 1,404,890 | Patten | Jan. 31, 1922 |
| 1,638,305 | Haas | Aug. 9, 1927 |
| 1,659,050 | Sasseman | Feb. 14, 1928 |
| 1,786,280 | Woodbridge | Dec. 23, 1930 |
| 2,342,929 | Fletcher | Feb. 29, 1944 |
| 2,354,877 | Peters | Aug. 1, 1944 |
| 2,366,505 | Fletcher | Jan. 2, 1945 |
| 2,369,826 | Heyer et al. | Feb. 20, 1945 |
| 2,421,828 | Bruney | June 10, 1947 |
| 2,432,069 | Pugh | Dec. 2, 1947 |
| 2,436,057 | Pugh | Feb. 17, 1948 |